United States Patent [19]

Horiuchi et al.

[11] Patent Number: 5,475,058
[45] Date of Patent: Dec. 12, 1995

[54] COMPOSITION OF POLYAMIDE, POLYESTER AND GLYCIDYL VINYLIC COPOLYMER

[75] Inventors: Hiroo Horiuchi; Mitsuo Wada, both of Shizuoka; Naoki Wakita, Hyogo; Kazushi Watanabe, Hiroshima, all of Japan

[73] Assignees: Polyplastics Co., Ltd.; Daicel Chemical Industries, Ltd., both of Osaka, Japan

[21] Appl. No.: 321,479

[22] Filed: Oct. 11, 1994

Related U.S. Application Data

[63] Continuation of Ser. No. 10,790, Jan. 29, 1993, abandoned.

[30] Foreign Application Priority Data

Jan. 31, 1992 [JP] Japan ..................... 4-016219

[51] Int. Cl.$^6$ ............. C08L 67/02; C08L 77/02; C08L 77/06; C08L 77/10
[52] U.S. Cl. .................. 525/166; 525/133; 525/153
[58] Field of Search ................................. 525/166

[56] References Cited

U.S. PATENT DOCUMENTS

| 4,317,764 | 3/1982 | Sheer | 525/166 |
| 4,753,980 | 6/1988 | Deyrup | 525/166 |
| 4,879,324 | 11/1989 | Lausberg et al. | 525/166 |
| 4,912,167 | 3/1990 | Deyrup et al. | 525/166 |
| 4,983,663 | 1/1991 | Orikasa et al. | 525/166 |

FOREIGN PATENT DOCUMENTS

| 57-100154 | 6/1982 | Japan | 525/166 |

*Primary Examiner*—Robert E. Sellers
*Attorney, Agent, or Firm*—Birch, Stewart, Kolasch & Birch

[57] ABSTRACT

The present invention provides a resin composition which is lowly water-absorbent and is excellent in properties such as mechanical strength, flexibility and heat resistance while improving the compatibility of the conventional resin composition comprising a polyamide resin and a thermoplastic polyester resin, and which comprises 100 parts by weight of a mixture composed of:

(A) 10 to 90% by weight of a polyamide resin having a molar ratio of the terminal carboxyl group to the terminal amino group of 1.5 or more, and (B) 90 to 10% by weight of a thermoplastic polyester resin, and incorporated therein, and (C) 0.1 to 10 parts by weight of a vinylic copolymer comprising 40 to 99% by weight of a specified vinyl monomer and 60 to 1% by weight of a specified vinyl monomer having a glycidyl ester group.

7 Claims, No Drawings

COMPOSITION OF POLYAMIDE, POLYESTER AND GLYCIDYL VINYLIC COPOLYMER

This application is a continuation of application Ser. No. 08/010,790 filed on Jan. 29, 1993, now abandoned.

BACKGROUND OF THE INVENTION

1. Field of the Invention

The present invention relates to a resin composition for molding comprising a polyamide resin, a thermoplastic polyester resin and a specified vinylic copolymer and having excellent mechanical properties and processability in molding.

2. Description of the Related Art

Although thermoplastic polyester resins are widely used as molding materials of virtue of their excellent mechanical properties, electrical properties and chemical resistance, low water absorbency and good processability, they have the problem of a low hydrolysis resistance, since a reduction in the strength thereof after exposure to hot water for a long period of time is serious. Although polyamide resins are also molding materials having excellent mechanical properties, electrical properties and chemical resistance like the thermoplastic polyester resins, they have the defect of a dimensional change and impairment of the mechanical properties due to water absorption by the amide group.

Various attempts were made at using a resin composition prepared by melt-blending a polyamide resin with a thermoplastic polyester resin for the purpose of making the best use of the excellent properties of these resins. However, when the resins of different kinds are melt-blended, the mutual dispersibility of them is usually low and the obtained mixture has only low mechanical strength and flexibility. Such attempts thus did not yield results of practical use. Although it is proposed in, for example, Japanese Patent Publication-A Nos. 103191/1976 and 42545/1983 to mix the resins in the polymerization step in order to overcome this defect, this proposal is also impractical, since a large-scale apparatus and a long mixing time are necessitated.

Further a composition comprising a mixture of a polyamide resin and a thermoplastic polyester resin, and incorporated therein, a reinforcing material or a compound effective in improving the impact resistance is proposed in, for example, Japanese Patent Publication-B Nos. 19101/1972 and 24465/1972, and Japanese Patent Publication-A Nos. 56742/1973, 34754/1981 and 49657/1982. Although the resin composition obtained by such a method has an improved mechanical strength and a water absorption rate lower than that of the polyamide resin, its tensile elongation at break is yet insufficient.

SUMMARY OF THE INVENTION

An object of the present invention is to provide a resin composition comprising a polyamide resin and a thermoplastic polyester resin having excellent properties such as mechanical strength, flexibility and heat resistance and a low water absorbency by improving the compatibility of the component resins.

After extensive investigations made for the purpose of overcoming the defects of polyamide and thermoplastic polyester resins without impairing the excellent properties of these resins by mixing them by a simple melt kneading method on an extruder, the inventors have found that moldings produced from a composition comprising a mixture composed of a polyamide resin having a specified concentration ratio of the terminal carboxyl group to the terminal amino group and a thermoplastic polyester resin, and incorporated therein, a specified vinylic copolymer have not only a fine, homogeneous dispersion structure but also excellent surface appearance, mechanical properties, and processability in extrusion and molding. The present invention has been completed on the basis of this finding.

Namely, the present invention relates to a resin composition for molding comprising 100 parts by weight of a mixture composed of:

(A) 10 to 90% by weight of a polyamide resin having a molar ratio of the terminal carboxyl group to the terminal amino group of 1.5 or more, and (B) 90 to 10% by weight of a thermoplastic polyester resin, and incorporated therein, and (C) 0.1 to 10 parts by weight of a vinylic copolymer comprising 40 to 99% by weight of at least one vinyl monomer represented by formula (I) and 60 to 1% by weight of at least one vinyl monomer having a glycidyl ester group represented by formula (II);

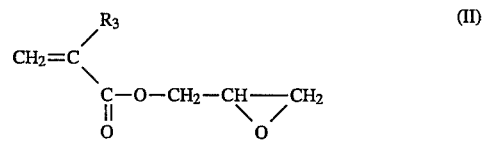

wherein $R_1$ represents a hydrogen atom or a lower alkyl group; $R_2$ represents a phenyl group, a cyano group or an alkyl ester group in which the alkyl group has 1 to 10 carbon atoms; and $R_3$ represents a hydrogen atom or a lower alkyl group.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The polyamide resin (A) to be used in the present invention comprises a polyamide mainly composed of an aliphatic amino carboxylic acid, lactam, or diamine and a dicarboxylic acid, and has a molar ratio of the terminal carboxyl group to the terminal amino group of 1.5 or more, preferably 3.0 or more. When the polyamide resin has a molar ratio of the terminal carboxyl group to the terminal amino group of below 1.5, the compatibility of this resin with the thermoplastic polyester resin is insufficient and problems such as unstable processability in extrusion, peeling from the molding surface and impairment of the properties will occur. The concentration of the terminal carboxyl group was determined by dissolving the polyamide resin in benzyl alcohol and conducting neutralization titration by the potentiometer titration method with 0.01 N-KOH. The concentration of the terminal amino group was determined by dissolving the polyamide resin in a solvent mixture comprising phenol and methanol (volume ratio: 10/1) and conducting the neutralization titration by the potentiometric titration method with 0.01 N-HCl.

Typical examples of the main constituents include amino carboxylic acids such as 6-aminocaproic acid, 11-aminoundecanoic acid and 12-aminododecanoic acid; lactams such as caprolactam and laurolactam; diamines such as tetramethylenediamine, hexamethylenediamine, undecamethylenediamine, dodecamethylenediamine, 2, 2,4-/2,4,4-trimethylhexamethylenediamine and 5-methylnonamethylenediamine; and dicarboxylic acids such as adipic acid, suberic acid, azelaic acid, sebacic acid, dodecanedioic acid and diglycolic acid. Copolyamides and mixed polyamides comprising a small amount of an aromatic or alicyclic component in addition to these aliphatic components are also usable. The aromatic and alicyclic components include p-aminomethylbenzoic acid, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, terephthalic acid, isophthalic acid, 2-chloroterephthalic acid, 2-methylterephthalic acid, 5-methylisophthalic acid, 5-sodiosulfoisophthalic acid, hexahydroterephthalic acid and hexahydroisophthalic acid.

The polyamides usable in the present invention include polycaproamide (nylon 6), polyhexamethyleneadipamide (nylon 66), polyhexamethylenesebacamide (nylon 610), polyhexamethylenedodecanamide (nylon 612), polyundecamethyleneadipamide (nylon 116), polyundecanamide (nylon 11) and polydodecanamide (nylon 12).

In the above-described polyamide resins, preferred are nylon 6, nylon 66 and nylon 12, and particularly preferred is nylon 12.

The degree of polymerization of the polyamide resin used herein is not limited. For example, nylon 6 and nylon 66 having a relative viscosity determined in the 1% concentrated sulfuric acid solution at 25° C. of 2.0 to 5.0 and nylon 12 having a relative viscosity determined in the 0.54 m-cresol solution at 25° C. of 1.5 to 2.4 can be selected without limitation.

The thermoplastic polyester resin (B) to be used in the present invention includes a polyester obtained by the polycondensation of a dicarboxylic acid compound and a dihydroxy compound, that of a hydroxy carboxylic acid compound, and that of a mixture of these three components, and the effect of the present invention can be obtained irrespective of whether the polyester is a homopolyester or a copolyester.

Examples of the dicarboxylic acid compounds usable herein include known dicarboxylic acid compounds such as terephthalic acid, isophthalic acid, naphthalenedicarboxylic acid, diphenyldicarboxylic acid, diphenyl ether dicarboxylic acid, diphenylethanedicarboxylic acid, cyclohexanedicarboxylic acid, adipic acid and sebacic acid, and their derivatives substituted by an alkyl, alkoxy or halogen. These dicarboxylic acid compounds can be used also in the form of an ester-forming derivative thereof, such as an ester with a lower alcohol, e.g. dimethyl ester. These compounds are used either singly or in the form of a combination of two or more of them in the present invention.

Examples of the dihydroxy compounds constituting the polyesters of the present invention include dihydroxy compounds such as ethylene glycol, propylene glycol, butanediol, neopentyl glycol, butenediol, hydroquinone, resorcinol, dihydroxyphenyl, naphthalenediol, dihydroxydiphenyl ether, cyclohexanediol and 2,2-bis(4-hydroxyphenyl)propane, polyoxyalkylene glycols and their derivatives substituted by an alkyl, alkoxy or halogen. They can be used either singly or in the form of a mixture of two or more of them.

Examples of the hydroxy carboxylic acids include hydroxybenzoic acid, hydroxynaphthoic acid and diphenyloxycarboxylic acid, and their derivatives substituted by an alkyl, alkoxy or halogen. Ester-forming derivatives of these compounds are also usable. They can be used either singly or in the form of a combination of two or more of them.

The thermoplastic polyester resin (B) may be a polyester having a branched or crosslinked structure prepared from those described above and a small amount of a trifunctional monomer such as trimellitic acid, trimesic acid, pyromellitic acid, pentaerythritol or trimethylolpropane.

Any of the thermoplastic polyesters formed by the polycondensation of the above-described compounds as the monomer component is usable either singly or in the form of a mixture of two or more of them in the present invention. Preferred are polyalkylene terephthalates, and still preferred are polyesters mainly comprising polybutylene terephthalate. The effect of the present invention is particularly remarkable when such a preferred polyester is used.

A preferred degree of polymerization of the polybutylene terephthalate used herein is such that the intrinsic viscosity determined in o-chlorophenol at 25° C. is preferably at least 0.5 dl/g.

The ratio of the component (A) to the component (B) in the resin composition of the present invention is 10 to 90% by weight to 90 to 10% by weight. When the amount of the component (A) is below 10%, none of the excellent properties such as chemical resistance and abrasion resistance of the polyamide resin can be obtained and defects of the thermoplastic polyester resin such as poor hydrolysis resistance appear unfavorably.

When the amount of the component (A) exceeds 90% by weight, the water absorbency becomes high and the dimensional change by water absorption becomes serious unfavorable. Still preferred amounts of the components (A) and (B) are 30 to 70% by weight and 70 to 30% by weight, respectively.

The vinylic copolymer (C) to be used in the present invention is a component necessary for the compatibilization of the polyamide resin (A) with the thermoplastic polyester (B). The vinylic copolymer is prepared by copolymerizing a monomer mixture of 99 to 40% by weight of at least one of the vinylic monomers of the above general formula (I) and 1 to 60% by weight of at least one of the glycidylated vinyl monomers of the above general formula (II).

The vinyl monomers of the above general formula (I) include styrene, α-methylstyrene, acrylonitrile, α-methylacrylonitrile, methyl acrylate, ethyl acrylate, butyl acrylate, 2-hydroxyethyl acrylate, hexyl acrylate, octyl acrylate, methyl methacrylate, ethyl methacrylate, butyl methacrylate, 2-ethylhexyl methacrylate, 2-hydroxyethyl methacrylate, hexyl methacrylate and octyl methacrylate.

Examples of the glycidylated vinyl monomers of the above general formula (II) include glycidyl acrylate, glycidyl methacrylate and glycidyl ethacrylate.

Examples of the vinylic copolymers (C) include glycidyl methacrylate/styrene copolymer, glycidyl methacrylate/styrene/acrylonitrile copolymer, glycidyl methacrylate/methyl methacrylate copolymer, glycidyl methacrylate/styrene/methyl methacrylate copolymer, glycidyl methacrylate/acrylonitrile/methyl methacrylate copolymer, glycidyl methacrylate/styrene/ethyl acrylate copolymer, glycidyl methacrylate/styrene/methyl methacrylate/butyl acrylate copolymer, and glycidyl methacrylate/styrene/methyl methacrylate/butyl methacrylate copolymer.

In these vinyl copolymers, preferred are glycidyl methacrylate/styrene copolymer, glycidyl methacrylate/styrene/acrylonitrile copolymer and glycidyl methacrylate/methyl methacrylate copolymer.

The amount of the component (II) copolymerized to form the vinylic copolymer (C) is 1 to 60% by weight, preferably 5 to 50% by weight and still preferably 10 to 30% by weight. When it is below 1% by weight, the effect in improving the compatibility of the polyamide resin with the polyester resin is only slight and, on the contrary, when it exceeds 60% by weight, the dispersion is unfavorably insufficient.

The amount of the vinylic copolymer (C) to be incorporated is 0.1 to 10 parts by weight for 100 parts by weight of the mixture of the components (A) and (B) in the above-described relative amounts. When the amount of the component (C) is below 0.1 part by weight, the compatibilizing effect is insufficient, and the particle diameter of both of the dispersed components are so large as to cause peeling on the surface of the molding due to an insufficient dispersion, to which reduces the strength. On the contrary, when the amount of the component (C) exceeds 10 parts by weight, gelled components are formed by the reaction of the glycidyl ester group of the component (C) to cause an extreme reduction in the fluidity and, therefore, the product is not suitable for use as the resin for injection molding. The amount of the component (C) to be incorporated is preferably 1 to 5 parts by weight and still preferably 1 to 3 parts by weight.

A fibrous, powdery or platy filler can be incorporated into the composition of the present invention depending on the purpose such as improvement in the mechanical strength, heat resistance, dimensional stability (distortion resistance and warpage) or electrical properties. The fibrous fillers usable herein include inorganic fibrous materials such as the fibers of glass, asbestos, carbon, silica, silica/alumina, zirconia, boron nitride, silicon nitride, boron and potassium titanate, and fibrous metals, e.g. fibrous stainless steel, aluminum, titanium, copper and brass. Particularly typical fibrous fillers are glass and carbon fibers. Further high-melting organic fibrous materials such as fluororesin and acrylic resin are also usable.

The powdery fillers include carbon black; silicates such as silica, quartz powder, glass beads, glass powder, calcium silicate, aluminum silicate, kaolin, talc, clay, diatomaceous earth and wollastonite; metal oxides such as iron oxide, titanium oxide, zinc oxide and alumina; metal carbonates such as calcium carbonate and magnesium carbonate; metal sulfates such as calcium sulfate and barium sulfate; and silicon carbide, silicon nitride, boron nitride and various metal powders.

The platy fillers include mica, glass flakes and various metal foils.

These inorganic fillers can be used either singly or in the form of a combination of two or more of them. The combination of the fibrous filler, particularly glass or carbon fiber with the granular and/or platy filler is particularly suitable for obtaining excellent mechanical strength, dimensional accuracy and electrical properties.

When the filler is used, it is desirable to use a binder or surface-treating agent, if necessary. Examples of the binder or surface-treating agent include functional compounds such as epoxy compounds, isocyanate compounds, silane compounds and titanate compounds. These compounds may be surface-treated or bound prior to the use or added in the course of the preparation of the materials.

The amount of the inorganic filler used is suitably determined depending on the purpose and the kinds of the additives in the range of 0 to 200 parts by weight for 100 parts by weight of a mixture of the polyamide resin (A) and polyester resin (B). For example, when an improvement in the mechanical strength, particularly rigidity, is intended, the inorganic filler is incorporated in an amount of preferably 5 to 200 parts by weight, particularly 10 to 150 parts by weight. When the amount of the inorganic filler is insufficient, the mechanical strength becomes relatively low and, on the contrary, when the amount is in excess of the above range, molding becomes difficult and a problem occurs in the mechanical strengths of the moldings.

The composition of the present invention may contain a small amount of another thermoplastic resin as assistant in addition to the above-described components depending on the purpose. Such a thermoplastic resin usable herein is any thermoplastic resin resistant to high temperature. Examples of these resins include polyethylene, polycarbonate, polyphenylene sulfide, polyphenylene oxide, polyacetal, polysulfone, polyether sulfone, polyether imide, polyether ketone and fluororesins. These thermoplastic resins can be used also in the form of a mixture of two or more of them.

Known substances usually added to thermoplastic resins, such as stabilizers, e.g. antioxidants and ultraviolet absorbers, antistatic agents, flame retardants, colorants, e.g. dyes and pigments, lubricants, crystallization accelerators and nucleating agents, can be suitably added to the composition of the present invention depending on the required properties.

The resin composition of the present invention can be produced by a process and with an apparatus usually used for the production of synthetic resin compositions. Namely, molding pellets can be prepared by mixing the necessary components together and kneading and extruding the resulting mixture on a single-screw or double-screw extruder. Processes which can be employed in the present invention include one which comprises mixing part of the necessary components as a master batch and molding the resultant mixture, and one which comprises pulverizing part or the whole of the resin components so as to improve the dispersion and mixing, mixing the components together and melt-extruding the mixture.

It is usually impossible to obtain a mixture of different polymers having an excellent stability in extrusion without impairing the appearance of the molding surface and mechanical properties thereof, since the compatibility of these polymers in each other is extremely low. However, the present invention makes it possible to obtain a molding material having improved hydrolysis resistance of a thermoplastic polyester resin and water absorbency of a polyamide resin without losing the intrinsic properties of the polyamide and thermoplastic polyester resins from a mixture composed of the polyamide resin and the thermoplastic polyester, by using a polyamide resin having a high concentration ratio of the terminal carboxyl group to the terminal amino group and incorporating a specified vinylic copolymer into the mixture so as to make fine, homogeneous dispersion possible.

EXAMPLES

The following Examples will further illustrate the present invention, which by no means limit the invention.

Examples 1 to 9 and Comparative Examples 1 to 4

Nylon 12 or nylon 66 as the component (A), polybutylene terephthalate resin (PBT) as the component (B) and a vinylic copolymer as the component (C) were mixed together in proportions specified in Table 1. The resultant mixture was melt-kneaded on a double-screw extruder to form a composition in the form of pellets. Then standard test pieces for the determination of the properties were prepared by molding and the properties of them were determined. The results are given in Table 1.

For comparison, the same compositions as those described above except that no component (C) is contained therein or a polyamide resin having a molar ratio of the terminal carboxyl group to the terminal amino group of 0.5 was used. The results are also given in Table 1.

The examined properties and the determination methods were as described below:

tensile properties: according to ASTM D-638 notched Izod impact strength: according to ASTM D-256 processability in extrusion (in the preparation of the pellets of the composition): The composition was extruded on a vented double-screw extruder having an inner diameter of 30 mm, and the extrusion state was observed. The peeling of the strand surface and breakage of the strands in the extrusion step were macroscopically observed, and the results were collectively classified into the following five ranks:

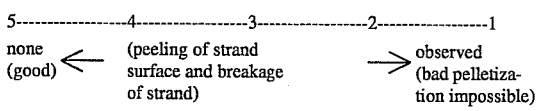

stat of molding surface: ASTM TYPE IV dumbbell specimens were prepared by molding and a cellophane tape was applied to each specimen and rapidly peeled off. The peeling state of the molding surface was macroscopically observed and the results were classified into the following five ranks:

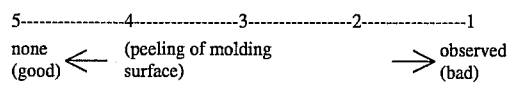

The meaning of the symbols of the compositions given in Table 1 are as follows:

A1: nylon 12 [—COOH]/[—NH$_2$]*=2.0

A2: nylon 66 [—COOH]/[—NH$_2$]=2.0

A1': nylon 12 [—COOH]/[—NH$_2$]=0.5

A2': nylon 66 [—COOH]/[—NH$_2$]=0.5

B1: PBT

C1: glycidyl methacrylate/styrene (20/80 by wt.) copolymer

C2: glycidyl methacrylate/styrene/acrylonitrile (20/50/30 by wt.) copolymer

C3: glycidyl methacrylate/methyl methacrylate (20/80 by wt.) copolymer

* [—COOH]/[—NH$_2$] represents the molar ratio of the terminal carboxyl group to the terminal amino group of the polyamide resin.

TABLE 1

| | Example | | | | | | | | | Comp. Ex. | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Composn. | | | | | | | | | | | | | |
| A | | | | | | | | | | | | | |
| Variety | A1 | A1 | A1 | A1 | A1 | A1 | A1 | A2 | A2 | A1 | A1' | A1' | A2' |
| wt. % | 50 | 50 | 50 | 30 | 70 | 50 | 50 | 50 | 50 | 50 | 50 | 50 | 50 |
| B | | | | | | | | | | | | | |
| Variety | B1 | B1 | B1 | B1 | B1 | B1 | B1 | B1 | B1 | B1 | B1 | B1 | B1 |
| wt. % | 50 | 50 | 50 | 70 | 30 | 50 | 50 | 50 | 50 | 50 | 50 | 50 | 50 |
| C | | | | | | | | | | | | | |
| Variety | C1 | C1 | C1 | C1 | C1 | C2 | C3 | C1 | C2 | — | — | C1 | C1 |
| pt. by wt.* | 3 | 5 | 1 | 3 | 3 | 3 | 3 | 3 | 3 | 0 | 0 | 3 | 3 |
| Properties | | | | | | | | | | | | | |
| tensile strength (kgf/cm$^2$) | 505 | 495 | 480 | 540 | 460 | 505 | 500 | 645 | 640 | — | — | 455 | 580 |
| tensile elongation (%) | >200 | >200 | >145 | >200 | >200 | >200 | >200 | 46 | 42 | — | — | 62 | 23 |
| notched impact strength (kgf cm/cm) | 5.1 | 4.7 | 4.3 | 3.2 | 6.1 | 4.8 | 4.7 | 4.1 | 4.0 | — | — | 3.1 | 2.4 |
| processability in | 5 | 5 | 5 | 5 | 5 | 5 | 5 | 5 | 5 | 1 | 1 | 3 | 3 |

TABLE 1-continued

|  | Example | | | | | | | | | Comp. Ex. | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| extrusion state of molding surface | 5 | 5 | 5 | 5 | 5 | 5 | 5 | 5 | 5 | — | — | 3 | 3 |

*based on 100 pt. by wt. of A + B

What we claim is:

1. A resin composition for molding, comprising 100 parts by weight of a mixture comprising:
   (A) 30 to 70% by weight of a polyamide resin having terminal carboxyl groups and terminal amino groups, and having a molar ratio of the terminal carboxyl group to the terminal amino group of 1.5 or more, and
   (B) 70 to 30% by weight of a thermoplastic polyester resin, and incorporated therein, and
   (C) 0.1 to 10 parts by weight, based on 100 parts by weight of components (A) and (B), of a vinylic copolymer consisting essentially of 40 to 99% by weight of at least one vinyl monomer represented by formula (I) and 60 to 1% by weight of at least one vinyl monomer having a glycidyl ester group represented by formula

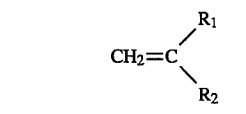

(I)

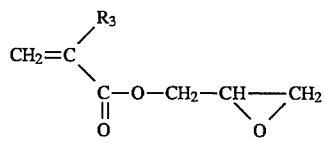

(II)

wherein $R_1$ represents a hydrogen atom or a lower alkyl group; $R_2$ represents a phenyl group, a cyano group or an alkyl ester group in which the alkyl group has 1 to 10 carbon atoms; and $R_3$ represents a hydrogen atom or a lower alkyl group.

2. The resin composition for molding according to claim 1, wherein the thermoplastic polyester resin (B) is polybutylene terephthalate.

3. The resin composition for molding according to claim 1, wherein the vinyl monomer having a glycidyl ester group in the vinylic copolymer (C) is present in an amount of 10 to 30% by weight.

4. The resin composition for molding according to claim 1, wherein $R_2$ is a phenyl group or a cyano group.

5. The resin composition for molding according to claim 1, wherein component (A) is selected from the group consisting of a polyamide obtained by by polymerizing an aliphatic amino carboxylic acid, a polyamide obtained by polymerizing a lactam, and a polyamide obtained by polymerizing a diamine and a dicarboxylic acid.

6. The resin composition for molding according to claim 1, wherein the molar ratio of the terminal carboxyl group to the terminal amino group is 3.0 or more.

7. The resin composition for molding according to claim 1, wherein the thermoplastic polyester resin (B) is a polyalkylene terephthalate.

\* \* \* \* \*